United States Patent
Lee

(10) Patent No.: US 9,872,137 B2
(45) Date of Patent: Jan. 16, 2018

(54) METHOD AND APPARATUS FOR PROVIDING LOCATION INFORMATION IN A WIRELESS ACCESS SYSTEM SUPPORTING A MISSION CRITICAL PUSH TO TALK SERVICE

(71) Applicant: LG ELECTRONICS INC., Seoul (KR)

(72) Inventor: Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/315,968

(22) PCT Filed: Jul. 7, 2015

(86) PCT No.: PCT/KR2015/006993
§ 371 (c)(1),
(2) Date: Dec. 2, 2016

(87) PCT Pub. No.: WO2016/006908
PCT Pub. Date: Jan. 14, 2016

(65) Prior Publication Data
US 2017/0094457 A1    Mar. 30, 2017

Related U.S. Application Data

(60) Provisional application No. 62/021,694, filed on Jul. 7, 2014.

(51) Int. Cl.
*H04W 24/00* (2009.01)
*H04W 4/02* (2009.01)
(Continued)

(52) U.S. Cl.
CPC .............. *H04W 4/02* (2013.01); *H04W 4/10* (2013.01); *H04W 12/06* (2013.01)

(58) Field of Classification Search
None
See application file for complete search history.

(56) References Cited

U.S. PATENT DOCUMENTS 9,137,735 B2 * 9/2015 Thomas ............... H04W 48/04
2006/0046759 A1   3/2006 Yoon et al.
(Continued)

FOREIGN PATENT DOCUMENTS

JP    2006-252017 A    9/2006
KR   10-0586413 B1    6/2006

OTHER PUBLICATIONS

3GPP, "3rd Generation Partnership Project; Technical Specification Group Services and System Aspects; Mission Critical Push to Talk MCPTT; (Release 13)," 3GPP TS 22.179 V0.4.0, May 2014 (Jun. 13, 2014), 25 pages.

*Primary Examiner* — Shantell L Heiber
(74) *Attorney, Agent, or Firm* — Birch, Stewart, Kolasch & Birch, LLP

(57) ABSTRACT

One of embodiments providing location information in a wireless access system supporting a MCPTT service comprises steps of: receiving, from a requesting UE, a report request message requesting a report of location information, the report request message encrypted with a credential of the requesting UE; verifying the credential of the requesting UE; and transmitting, to the requesting UE, a report response message including the location information of the requested UE, when the credential of the requesting UE has been verified; or transmitting, to the requesting UE, a request reject message indicating the report request is denied, when the credential of the requesting UE is not verified, wherein the credential is configured with an identifier of the requesting UE and a qualification of the MCPTT service, and the MCPTT service is used for a public safety (Continued)

and utility services and provides communication among the requesting and the requested UEs.

12 Claims, 7 Drawing Sheets

(51) Int. Cl.
*H04W 4/10* (2009.01)
*H04W 12/06* (2009.01)

(56) References Cited

U.S. PATENT DOCUMENTS

| | | | |
|---|---|---|---|
| 2007/0270164 A1* | 11/2007 | Maier | H04W 64/00 455/456.2 |
| 2008/0122685 A1 | 5/2008 | Vassilovski | |
| 2011/0165892 A1* | 7/2011 | Ristich | H04W 64/00 455/456.2 |
| 2011/0215949 A1* | 9/2011 | Yarnold | G08G 1/123 340/989 |
| 2012/0011587 A1* | 1/2012 | Byrne | G06F 21/6218 726/21 |
| 2015/0319585 A1* | 11/2015 | Raj | H04W 4/10 455/518 |

* cited by examiner

[Fig. 1]
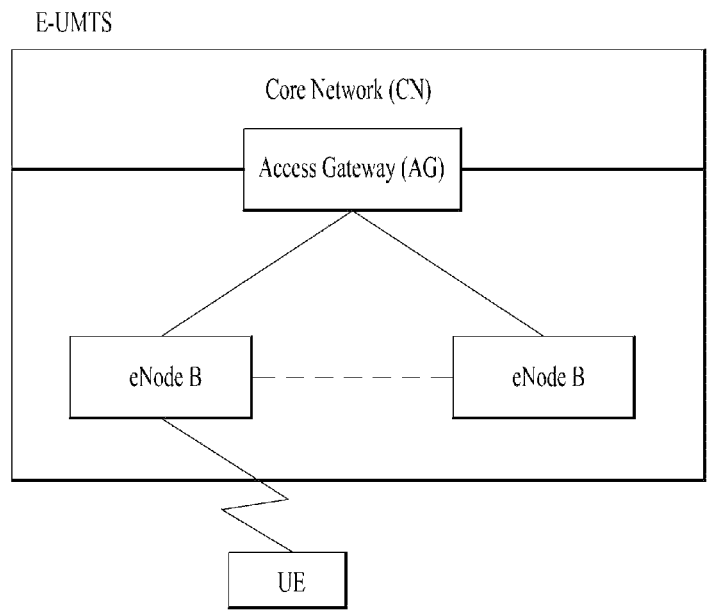
[Fig. 2]
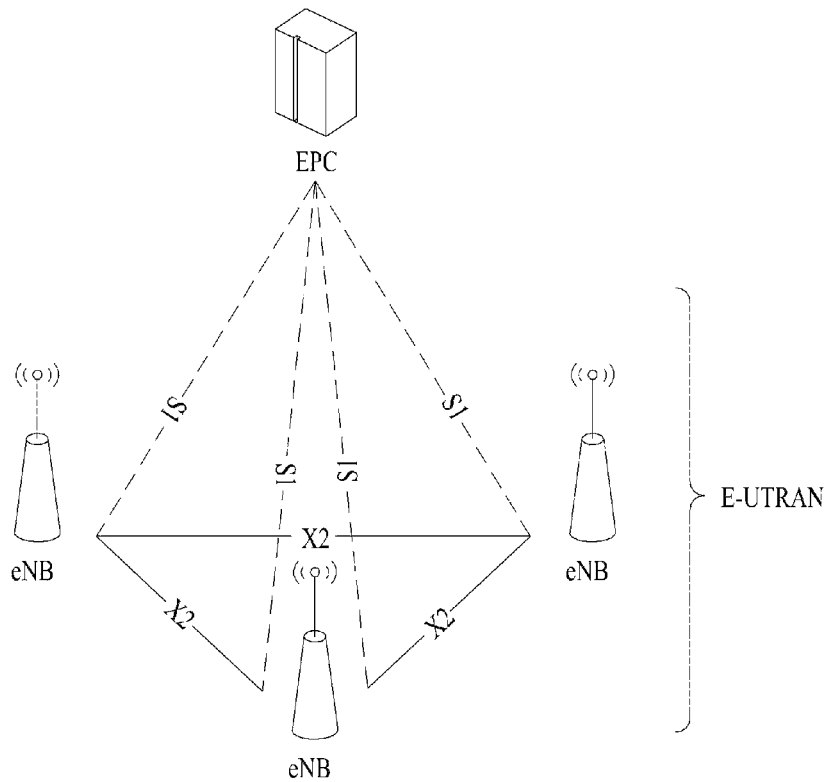

[Fig. 3]
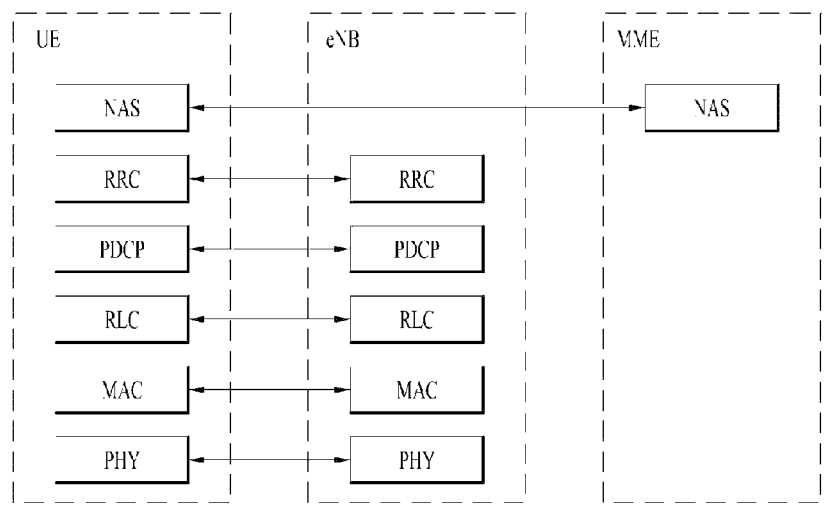
( a ) Control-Plane Protocol Stack
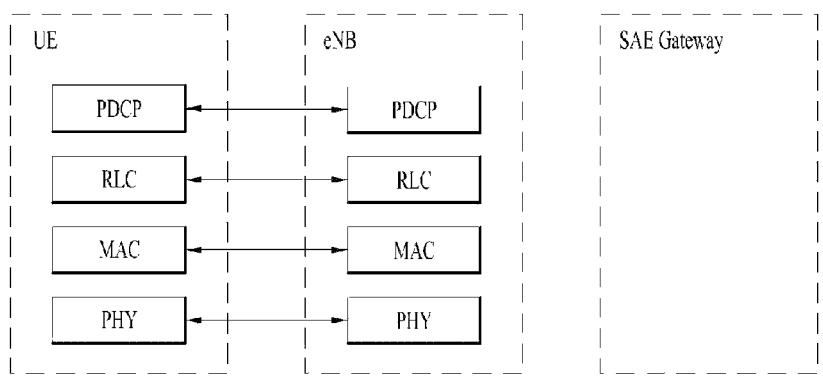
( b ) User-Plane Protocol Stack

[Fig. 4]
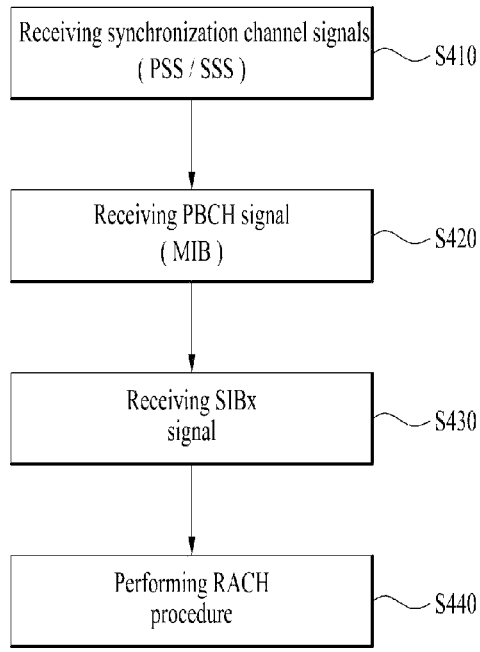
[Fig. 5]
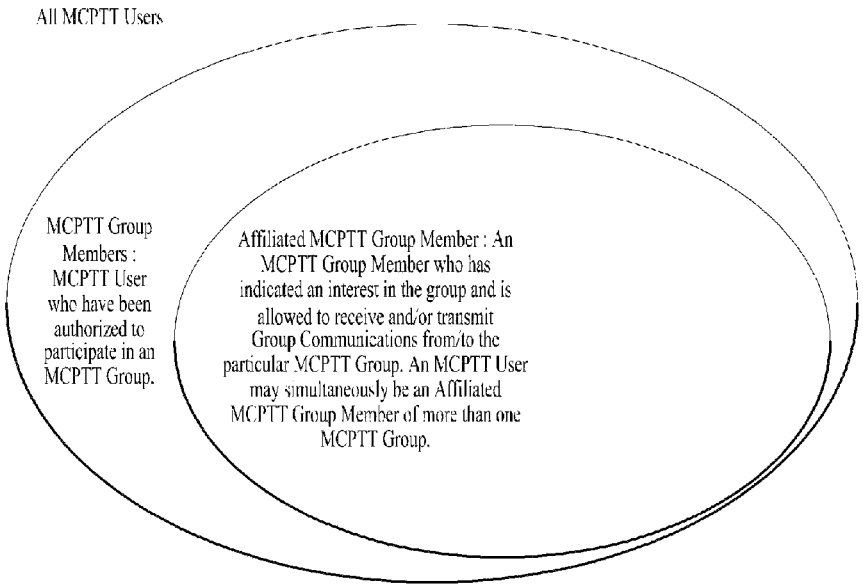

[Fig. 6]
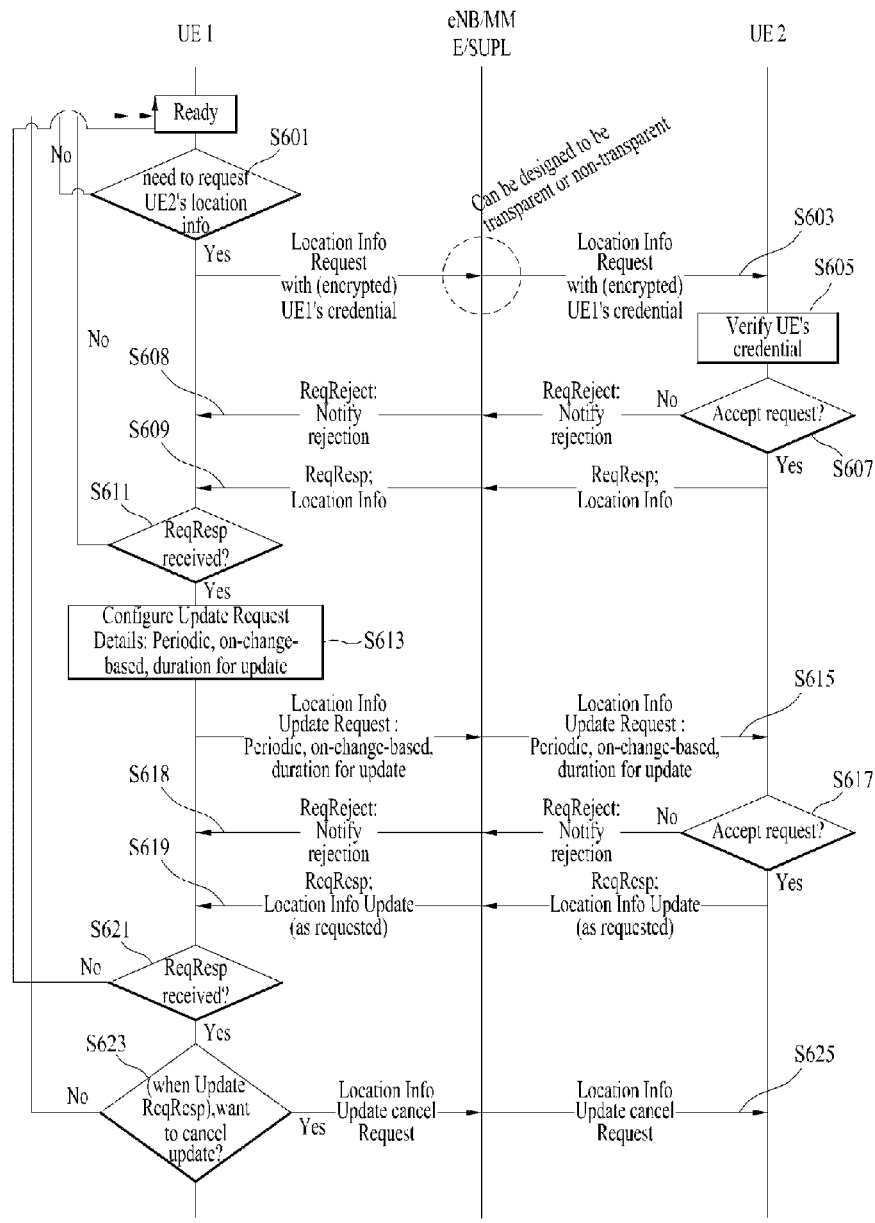

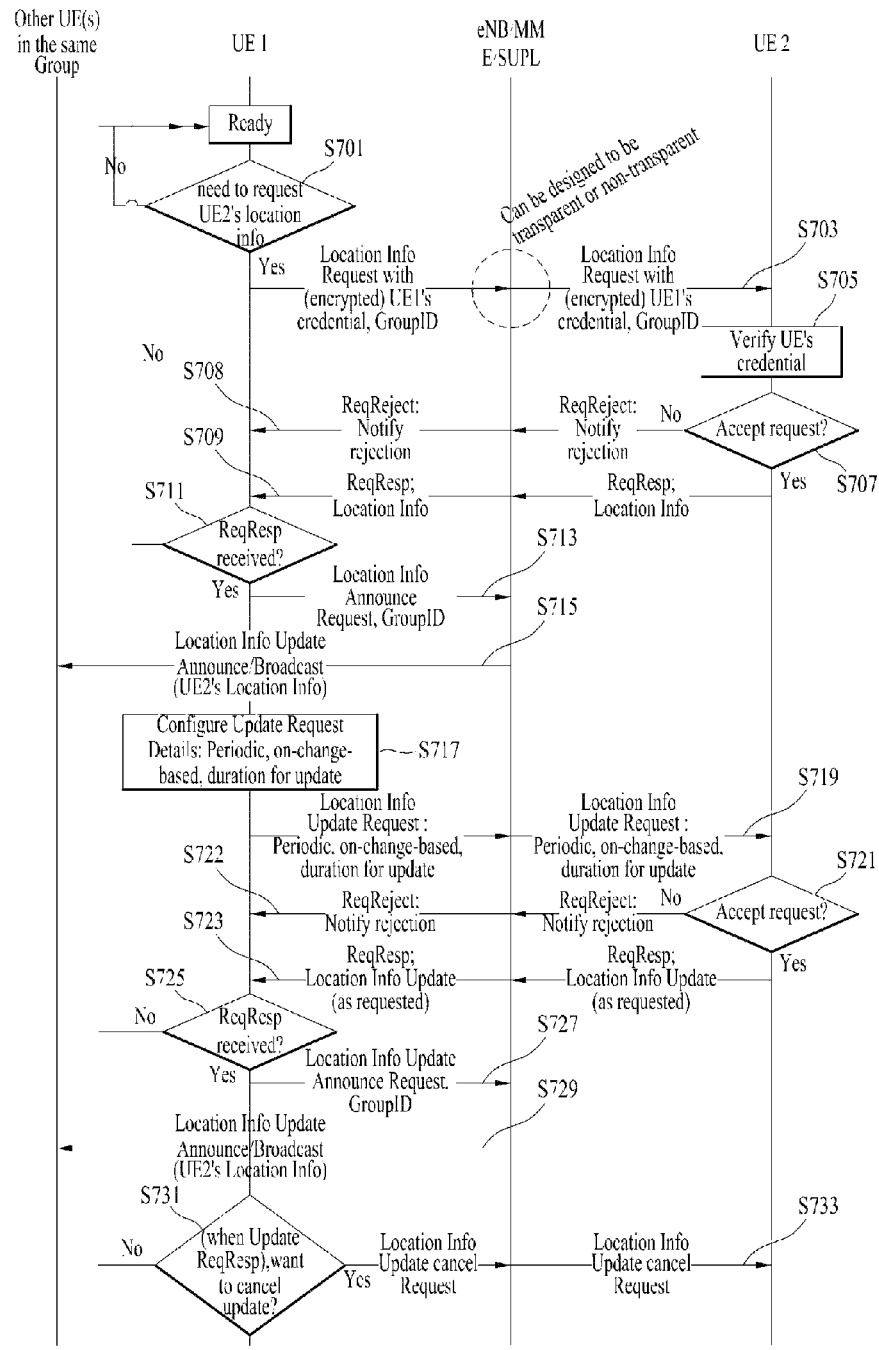

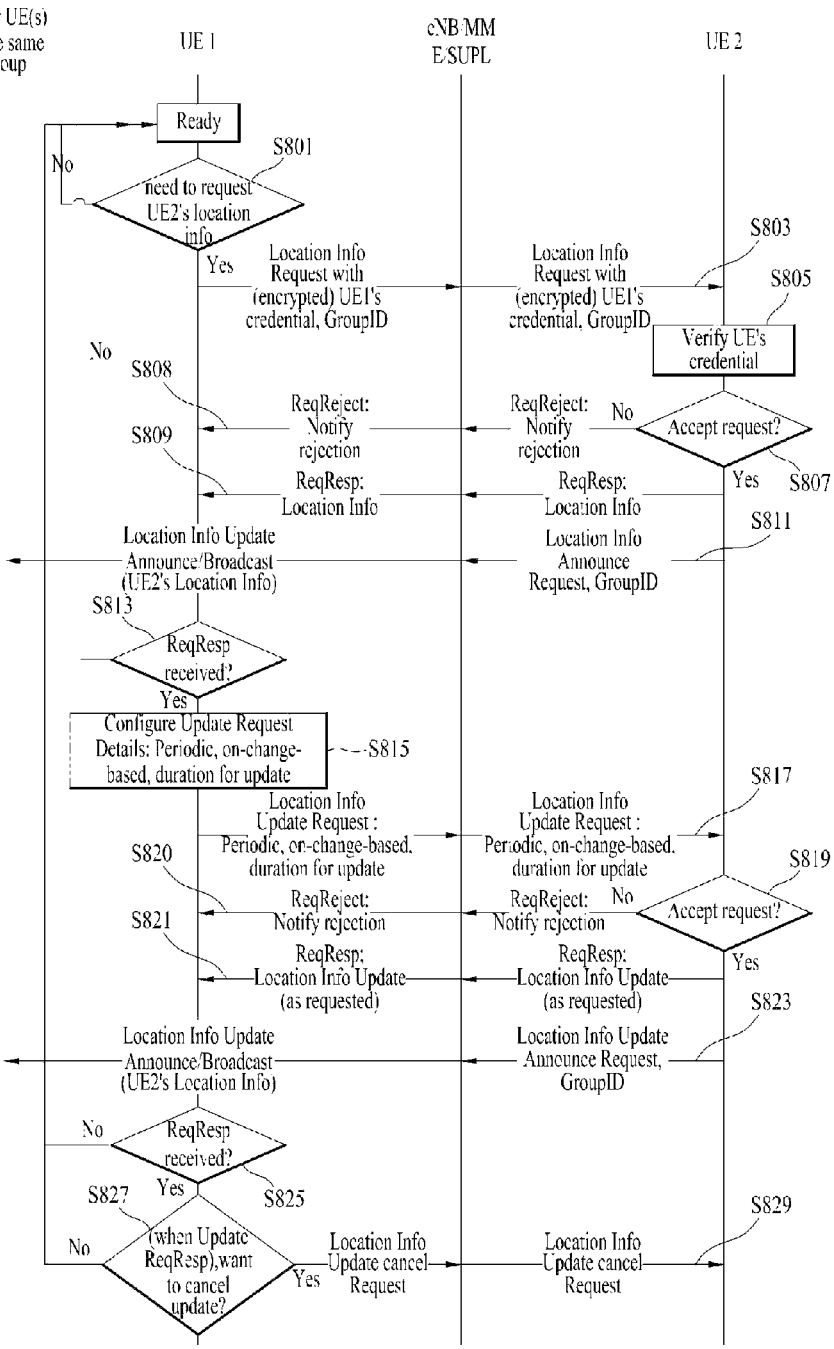

[Fig. 9]
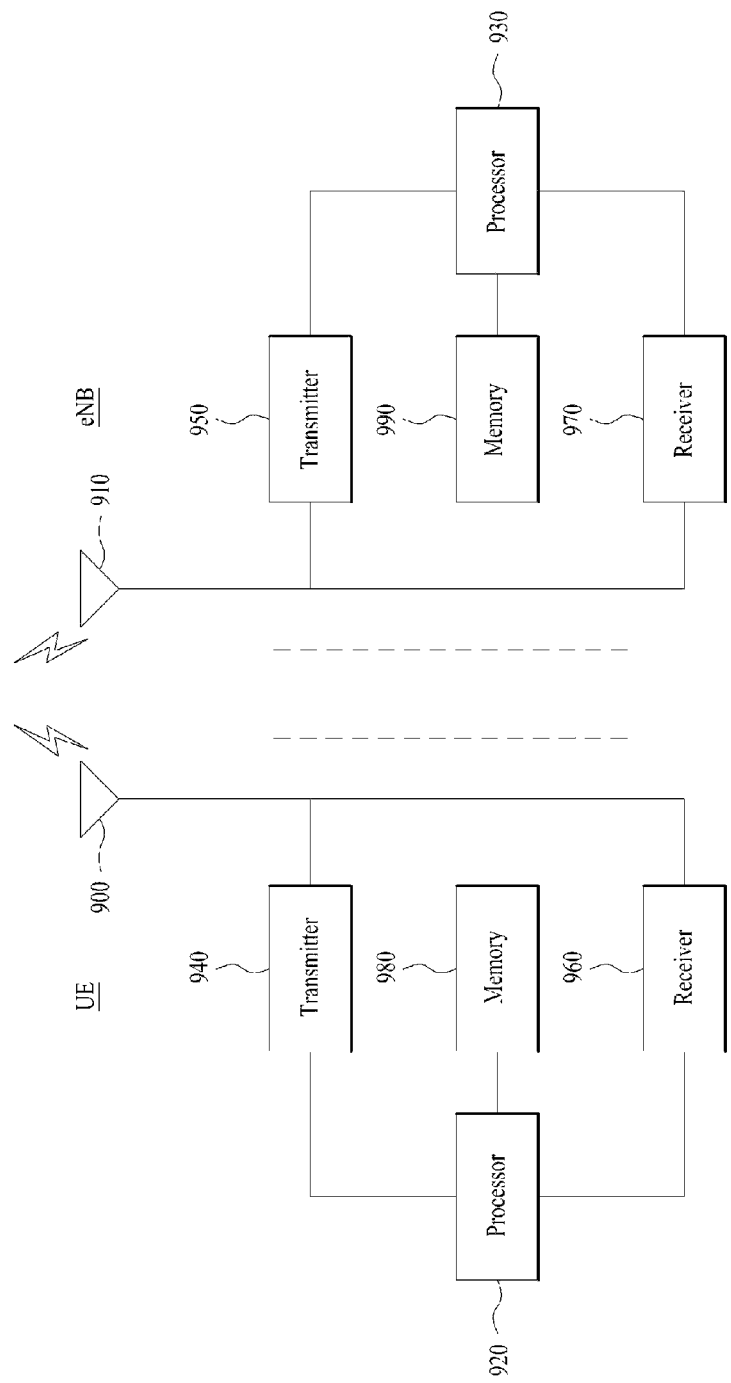

METHOD AND APPARATUS FOR PROVIDING LOCATION INFORMATION IN A WIRELESS ACCESS SYSTEM SUPPORTING A MISSION CRITICAL PUSH TO TALK SERVICE

CROSS REFERENCE TO RELATED APPLICATIONS

This application is the National Phase of PCT International Application No. PCT/KR2015/006993, filed on Jul 7, 2015, which claims priority under 35 U.S.C. 119(e) to U.S. Provisional Application No. 62/021,694, filed on Jul 7, 2014, all of which are hereby expressly incorporated by reference into the present application.

TECHNICAL FIELD

The present invention relates to a wireless access system, and more particularly, to methods and apparatus for providing location information to be used for supporting a Mission Critical Push To Talk (MCPTT) service over LTE.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE OF INVENTION

Technical Problem

An object of the present invention is to provide methods for requesting a location information report and updating the location information of a current talker in order to support the MCPTT service.

Another object of the present invention is to provide methods for deactivating location information update report of the current talker if the type of the ongoing update report is recurring.

Still another object of the present invention is to provide the location information to the MCPTT group member.

Still another object of the present invention is to provide apparatus such as a user equipment (UE) and/or a base station for supporting the above-described methods.

Technical problems to be solved by the present invention are not limited to the above-mentioned technical problem, and other technical problems not mentioned above can be clearly understood by one skilled in the art from the following description.

Solution to Problem

The present invention relates to a method and apparatus for providing location information to be used for supporting a Mission Critical Push To Talk (MCPTT) service.

In one aspect of the present invention, a method for providing location information in a wireless access system supporting a Mission Critical Push to Talk over LTE (MCPTT) service, the method performed by a requested user equipment (UE) and comprising steps of: receiving, from a requesting UE, a report request message requesting a report of location information, the report request message encrypted with a credential of the requesting UE; verifying the credential of the requesting UE; and transmitting, to the requesting UE, a report response message including the location information of the requested UE, when the credential of the requesting UE has been verified; or transmitting, to the requesting UE, a request reject message indicating the report request is denied, when the credential of the requesting UE is not verified, wherein the credential is configured with an identifier (ID) of the requesting UE and a qualification of the MCPTT service, and the MCPTT service is used for a public safety and utility services and provides communication among the requesting and the requested UEs.

The step of verifying may further verify whether the report request is related to the MCPTT service or non-MCPTT service based on the credential.

The step of verifying may further verify whether or not the requesting UE is a member of an MCPTT Group.

The method may further comprise transmitting, to an eNB, an announcement requested message including the location information and a group ID of a MCPTT Group.

The method may further comprise receiving an update request message including configuration information indicating a report type of a location information update.

The report type may indicate one of a periodic update, a duration based update, or an on-change-based update. In this case, the method may further comprise receiving an update cancellation request message from the requesting UE.

In another aspect of the present invention, a requested user equipment (UE) for providing location information in a wireless access system supporting a Mission Critical Push to Talk over LTE (MCPTT) service comprises a transmitter; a receiver; and a processor controls the transmitter and the receiver for providing the location information. In this case, the processor may be configured to: receive, by controlling the receiver from a requesting UE, a report request message requesting a report of location information, the report request message encrypted with a credential of the requesting UE; verify the credential of the requesting UE; and transmit, by controlling the transmitter to the requesting UE, a report response message including the location information of the requested UE, when the credential of the requesting UE has been verified; or transmit, to the requesting UE, a request reject message indicating the report request is denied, when the credential of the requesting UE is not verified, wherein the credential is configured with an identifier (ID) of the requesting UE and a qualification of the MCPTT service, and the MCPTT service is used for a public safety and utility services and provides communication among the requesting and the requested UEs.

The processor may further verify whether the report request is related to the MCPTT service or non-MCPTT service based on the credential.

The processor may further verify whether or not the requesting UE is a member of an MCPTT Group.

The processor may be further configured to transmit, by using the transmitter to an eNB, an announcement requested message including the location information and a group ID of a MCPTT Group.

The processor may be further configured to receive, by using the receiver, an update request message including configuration information indicating a report type of a location information update.

The report type may indicate one of a periodic update, a duration based update, or an on-change-based update.

The processor may be further configured to receive an update cancellation request message from the requesting UE.

The above embodiments are part of preferred embodiments of the present invention.

Obviously, it is to be understood to those having ordinary knowledge in the art that various embodiments having the technical features of the present invention can be implemented on the detailed description of the present invention as set forth herein.

Advantageous Effects of Invention

According to exemplary embodiments of the present invention, the following advantages can be obtained.

Firstly, it is possible to efficiently report the location information to be used for the MCPTT services.

Secondly, the location information for the MCPTT services can be transmitted in secret to the requesting UE or the MCPTT group members according to the credential of the UE.

Besides, the location information can be updated according to the MCPTT service types.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 1 illustrates a schematic structure a network structure of an evolved universal mobile telecommunication system (E-UMTS);

FIG. 2 illustrates a schematic structure of an Evolved Universal Terrestrial Radio Access Network (E-UTRAN);

FIG. 3 illustrates the configurations of a radio interface protocol between the E-UTRAN and a UE;

FIG. 4 illustrates one of examples of the initial access procedure used in LTE/LTE-A systems.

FIG. 5 illustrates user categories for MCPTT groups.

FIG. 6 is a flowchart illustrating a method for requesting a location information report, updating location information, and canceling the location information update performed in private call case of the MCPTT.

FIG. 7 is a flowchart illustrating a method for requesting a location information report, updating location information, and canceling the location information update performed in group call case of the MCPTT.

FIG. 8 is a flowchart illustrating another method for requesting a location information report, updating location information, and canceling the location information update performed in group call case of the MCPTT.

FIG. 9 shows apparatuses for implementing the above-mentioned methods described with reference to FIGS. 1 to 8.

MODE FOR THE INVENTION

Exemplary embodiments of the present invention provide a method and apparatus for providing location information used for MCPTT services.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an ABS (Advanced Base Station), an access point, etc.

The term UE may be replaced with the terms MS (Mobile Station), SS (Subscriber Station), MSS (Mobile Subscriber Station), AMS (Advanced Mobile Station), mobile terminal, etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an MS may serve as a transmitter and a BS may serve as a receiver, on uplink. Likewise, the MS may serve as a receiver and the BS may serve as a transmitter, on downlink.

The embodiments of the present invention are supported by standard documents disclosed for at least one of wireless access systems including IEEE 802.xx systems, a 3GPP system, a 3GPP LTE system, and a 3GPP2 system. In particular, the embodiments of the present invention are supported by 3GPP TS 22.011, 3GPP TS 36.211, 3GPP TS 36.212, 3GPP TS 36.213, 3GPP TS 36.321, and 3GPP TS 36.331 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink Information transmitted and received between the UE and the BS includes general data information and control information. A variety of physical channels are provided according to type/use of information transmitted and received between the UE and the BS.

1.1 System Architecture

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 8 to Release 11 of "3rd Generation Partnership Project; Technical Specification Group Radio Access Network".

Referring to FIG. 1, the E-UMTS mainly includes a User Equipment (UE), base stations (BSs, or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

FIG. 2 illustrates a network structure of an Evolved Universal Terrestrial Radio Access Network (E-UTRAN) system. The E-UTRAN system is an evolved version of the conventional UTRAN system. The E-UTRAN includes one or more base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like.

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

1.2 Initial Access Procedure

The initial access procedure may be configured with a cell search procedure, a system information acquisition procedure and a random access procedure.

FIG. 4 illustrates one of examples of the initial access procedure used in LTE/LTE-A systems.

UE may acquire downlink synchronization information by receiving a Primary Synchronization Signal (PSS) and a Secondary Synchronization Signal (SSS) which are transmitted from the eNB. The synchronization signals are transmitted twice every frame unit. That is, the synchronization signals are transmitted at every 5 ms (S410).

A Physical Cell ID (PCID), downlink time and frequency synchronization information, and length information of cyclic prefix (CP) may be included in the synchronization signals at step S410.

And then, the UE receives Physical Broadcast Channel (PBCH) signals transmitted through a PBCH. In this case, the PBCH signals are repeatedly transmitted 4 times by using different scrambling sequences each other during 4 frames (i.e., 40 ms).

The PBCH signals includes Master Information Block (MIB) which is one of system information. One MIB is configured with 24 bits and 14 bits of them are used for representing physical HARQ indication channel (PHICH) configuration information, downlink cell bandwidth (dl-bandwidth) information, and a System Frame Number (SFN). The rest 10 bits can be configured as reserved bits.

After then, the UE is able to acquire other system information by receiving individual System Information Block (SIB)s transmitted from the eNB. The SIBs are transmitted on DL-SCH, and it is checked that whether the SIBs exist or not by receiving PDCCH signals masked with System Information Radio Network Temporary Identities (SI-RNTI).

System Information Block type 1 (SIB1) of SIBs includes parameters necessary for deciding the cell is suitable for a sell selection or not and time domain scheduling information for the other SIBs. SIB2 includes common channel information and shared channel information. SIB3 to SIB8 includes cell reselection related information, InterFrequency information, and/or Intra-Frequency information. SIB9 is used for transferring a name of a Home eNodeB (HeNB), and SIB10-SIB12 includes waring messages for an Earthquake and Tsunami Warning Systems (ETWS) and a Commercial Mobile Alert System (CMAS). Lastly, SIB13 includes control information related to MBMS.

The UE is able to perform the random access procedure after performing steps S410 to S430. Especially, the UE may acquire parameters for transmitting Physical Random Access Channel (PRACH) by receiving the SIB2 from above described SIBs. Accordingly, the UE is able to perform the random access procedure with the eNB by generating and transmitting the PRACH signal based on the parameters included in the SIB2.

2. Mission Critical Push to Talk (MCPTT)

2.1 Overview on MCPTT

FIG. 5 illustrates user categories for MCPTT groups.

A Push To Talk (PTT) service provides an arbitrated method by which two or more users may engage in communication. Users may request permission to transmit (e.g., traditionally by means of a press of a button). The MCPTT service over LTE/LTE-A system supports an enhanced PTT service, suitable for mission critical scenarios, based upon 3GPP Evolved Packet System (EPS) services. The examples of the mission critical scenarios may be a public safety and utility services such as rail roads, water works, and electricity etc. In addition, the requirements for MCPTT service defined within can also form the basis for a non-mission critical push to talk (PTT) service.

The MCPTT service is intended to support communication between several users (a group call), where each user has the ability to gain access to the right to talk in an arbitrated manner. However, the MCPTT service also supports private calls between pairs of users. The MCPTT service builds on the existing 3GPP transport communication mechanisms provided by the EPS architectures to establish, maintain, and terminate the actual communication path(s) among the users. The MCPTT service also builds upon service enablers, such as GCSE_LTE (Group Communication System Enablers for LTE) and ProSe (Proximity Services).

The MCPTT service allows users to request the right to talk (transmit voice/audio) and provides a deterministic mechanism to arbitrate between requests that are in contention (i.e., floor control). When multiple requests occur, the determination of which user's request is accepted and which users' requests are rejected or queued is based upon a number of characteristics (including the respective priorities of the users in contention). The MCPTT service provides a means for a user with higher priority (e.g., emergency condition) to override (interrupt) the current talker. The MCPTT service also supports a mechanism to limit the time a user is able to talk (hold the floor) thus permitting users of the same or lower priority a chance to gain the floor.

The MCPTT service provides the means for a user to monitor activity on a number of separate calls and enables the user to switch focus to a chosen call. An MCPTT service user may join an already established MCPTT group call (late call entry). In addition the MCPTT service provides Talker ID and user location determination features.

The users of an MCPTT service may have more stringent expectations of performance than the users of a commercial PTT service. The MCPTT service can be used by non-mission critical users (e.g., utility companies and railways) under very exceptional cases.

The relationship between MCPTT users and MCPTT Groups is shown in FIG. 5. Referring to FIG. 5, the MCPTT group Members includes the affiliated MCPTT group Member. In this case, the MCPTT group members represent MCPTT users who have been authorized to participate in an MCPTT group and the affiliated MCPTT group members represent an MCPTT group member who has indicated an interest in the group and is allowed to receive and/or transmit Group communications from/to the particular MCPTT group. The MCPTT users may simultaneously be an Affiliated MCPTT group member of more than one MCPTT group.

2.2 Definitions in MCPTT

Hereinafter, terminologies and definitions for MCPTT services are more specifically described and the terminologies and definitions can be applied to the embodiments of the present application.

For the purposes of the present application, the terms and definitions given in TR 21.905 document and the following can be applied. A term defined in the present application takes precedence over the definition of the same term, if any, in TR 21.905 document.

The Affiliated MCPTT Group Member means an MCPTT Group Member who has indicated an interest in the group and is allowed to receive and/or transmit Group Communications from/to the particular MCPTT Group. An MCPTT User may simultaneously be an Affiliated MCPTT Group Member of more than one MCPTT Group.

A Broadcast Group Call means a group call where the initiating MCPTT user expects no response from the other MCPTT users, so that when his transmission is complete, so is the call. The target MCPTT users may be a subset of all of the system users, or it may be all of the system users.

An emergency State represents a heightened condition of alarm for an MCPTT user indicating a need for immediate assistance due to a personal life-threatening situation.

A floor control is the arbitration system in the MCPTT service that determines who has the authority to transmit (talk) at a point in time. This functionality is used in MCPTT One-to-one Calls and MCPTT Group Calls.

A group-Broadcast Group means a collection of groups defined by the MCPTT Administrator (e.g. representing a particular organizational structure) and intended to be the recipients of Broadcast Group Calls.

A group Regroup means a temporary combining of a multiplicity of groups into a single group.

An imminent Peril call means a call prioritized in the event of immediate threat to any human life such as resulting from an authorized user's observation of or engagement in a situation involving imminent peril to the general public (e.g., forest fire about to encircle campers, tanker truck ready to explode near a school, casualties at scene of a car bombing). The imminent peril is an urgent call and highlights the potential of death or serious injury.

An in-progress Emergency means an emergency condition for a group that has been accepted by MCPTT service, but has not yet been cancelled by an authorized user.

An in-progress Imminent Peril means an Imminent Peril Group Call was granted and it has not yet been cancelled by an authorized user.

A location means the current physical location (i.e., co-ordinates plus estimated accuracy and timestamp) of the MCPTT UE that can be cross-referenced to a map.

A losing audio means audio of an overridden talker that is not dismissed, but instead allowed to be routed to suitable authorized receivers.

A MCPTT Emergency Alert means a notification from the MCPTT UE to the MCPTT service that the MCPTT User has an emergency condition.

A MCPTT Emergency Group Call means a group call processed with a very high level of priority. If required, in-progress group calls are pre-empted in order to provide the resources for the Emergency Group Call.

A MCPTT Emergency State means a heightened condition of alarm for an MCPTT user indicating a need for immediate assistance due to a personal life-threatening situation.

A MCPTT Group means a GCSE Group being used for MCPTT.

A MCPTT Group Member means an MCPTT User who has been authorized to participate in Group Communications of a particular MCPTT Group. An MCPTT user may simultaneously be a group member of one or more MCPTT groups.

A MCPTT user means a user, identified by a subscription to an MCPTT Service, who has a UE with the capability to participate in MCPTT services.

A participant means an MCPTT User who is currently receiving and/or transmitting in an MCPTT Group Call or a 1:1 (private) call.

A participant type means a functional category of the participant (e.g. Normal, Supervisor, Dispatch, Supervisor Dispatch), typically defined by the MCPTT Administrators. At any moment in time in a call, a participant is of only one type.

A personality provisioning means the ability to implement into an MCPTT UE the characteristics indicative of a specific agency's user(s) with particular access to MCPTT Groups associated with that agency. These characteristics may include Group IDs, Group ID alias, Talker ID, Talker ID alias, Group scanning lists, and other parameters that are required by an MCPTT user when using MCPTT Service.

A pre-emption means the act of terminating on-going calls in order to free up resources for a higher priority call request.

A Project 25 RFSS means a Project 25 Radio Frequency (RF) Subsystem as defined in the TIA-102 specifications.

A MCPTT request means the action taken by an MCPTT user to request the right to transmit voice on a MCPTT Session.

A MCPTT session means a MCPTT Session is an audio communication session established between MCPTT users.

A receiving MCPTT Group Member means an Affiliated MCPTT Group Member who is currently receiving Group Communication from an MCPTT Group.

A selected MCPTT Group means the MCPTT Group that a particular MCPTT Group Member uses for transmission. An MCPTT Group Member may have zero, one or multiple Selected MCPTT Groups.

A System Call means a special case of a Broadcast Group Call that is transmitted to all users in a dynamically defined geographic area.

A Talker ID means an application layer identity that uniquely identifies the current speaker and may represent either an MCPTT User or, in P25 systems, a subscriber unit.

A Top of Queue means that when resources are not available to grant a call request, groups with "top of queue" priority are queued and are allocated system resources prior to any lower priority call requests.

A transmitting MCPTT Group Member means an Affiliated MCPTT Group Member who is currently transmitting a Group Communication to a Selected MCPTT Group.

A User-Broadcast Group means a collection of users defined by the MCPTT Administrator (e.g. representing a particular organizational structure) and intended to be the recipients of Broadcast Group Calls.

A User Regroup means the temporary combining of a multiplicity of users into a new group.

3. Location Information Reporting in MCPTT 3.1 Problem Statement

In 3GPP LTE/LTE-A systems, there are service requirements on using the talker's location information as follows.

The MCPTT service may be capable of providing the location information of the current talker to an authorized user, subject to privacy restrictions. An authorized MCPTT user may be able to restrict the MCPTT UE from supplying location information to the MCPTT service. The MCPTT service may support conveyance of precise location information provided by the MCPTT UE. The MCPTT service may support conveyance of location information provided by 3GPP/LTE location services. The MCPTT service may provide for the flexibility to convey future formats of location information. The MCPTT service may provide a means for an authorized user to restrict the dissemination of his location information. The MCPTT service may provide a means for MCPTT Administrators to manage the privacy of location information for MCPTT Users within their authority. The MCPTT service may provide end-to-end confidentiality of location information. The MCPTT service may provide authentication of messages carrying location information.

The use of location information of the UE in MCPTT has a wide range of use cases in the real field of applications. Among them, it is a very common case that the Public Safety officers (i.e., the MCPTT UE) have geographical movement in nature in order to perform their duty in the area of incident. For example, it was reported that around 700 car chases by the police were reported in the city of (not the county of) Los Angeles alone, in U.S.A in 2002 ("Los Angeles urges media to curb coverage of police chases", The Sydney Morning Herald, Feb. 28, 2003.). Many other possible use cases include, for example: (1) the cases with low-speed MCPTT UEs and/or a combination of low/high speed MCPTT UEs, and (2) the cases with the event situation changes (e.g., the wildfire becomes worse or extends to another area).

Depending on the situation, it may turn out to be the case where the location information becomes necessary although the information was not necessary seconds or minutes ago. In addition, depending on the situation, their location information should be updated and the speed of their geographical (or aeronautical) movement is high, which requires that the update be made more frequently than in the opposite case.

In order for the police chase to be performed in an orderly and efficient manner, the supporting communication equipment for the Public Safety officers may need to suffice some requirements such as location information for the MCPTT UEs.

However, the 3GPP LTE/LTE-A systems do not precisely define how to make a request for location information report or sharing the second MCPTT UE by the first MCPTT UE. Hereinafter, the embodiments of the present invention are described by considering the MCPTT Group Call and MCPTT Private Call cases.

3.2 Requesting Location Information Report

The entities will be appeared in embodiments of the present invention is defined first. A requesting UE is a UE that sends a request for location information of the other UE, and a requested UE is a UE that receives a request of the location information report from the requesting UE. For example, if a UE1 sends a Location Information Request message to a UE2, the UE1 is said to be the requesting UE whereas the UE2 is said to be the requested UE. In addition, it is assumed that the UE1 and the UE2 are able to support a private call and/or a group call of the MCPTT service. Besides, an eNB, a Mobile Management Entity (MME), and/or a Secure User Plane Location (SUPL) can be seen as the MCPTT taking counterpart member depending on situation.

The SUPL is one of location server. The location server is a physical or logical entity (e.g., an Enhanced Serving Mobile Location Centre (E-SMLC) or a SUPL Location Platform (SLP)) that manages positioning for a target device (e.g., the UE) by obtaining measurements and other location information from one or more positioning units and providing assistance data to positioning units to help determine this. The location server may also compute or verify the final location estimate. In addition, a LTE Positioning Protocol (LPP) is used point-to-point between a location server (e.g., E-SMLC or SLP) and the target device in order to position the target device using position-related measurements obtained by one or more reference sources transmitted from the eNB.

In the embodiments of the present invention, a credential can be defined with the requesting UE's ID and a qualification of the MCPTT service. That is, if the requested UE received request messages encrypted with the credential, the request UE can recognize that who wishes the request and it is used for the MCPTT service, and then the requested UE provides the location information to the requesting UE.

FIG. 6 is a flowchart illustrating a method for requesting a location information report, updating location information, and canceling the location information update performed in private call case of the MCPTT.

Referring to FIG. 6, the UE1 is ready to MCPTT service and the UE1 is able to perform the MCPTT talk.

The UE1 may check that whether the UE1 is needed to request the other UE's location information for performing the MCPTT service (S601).

If the location information of the other UE is needed, the UE1 transmits a report request message requesting location information to the UE2 via the eNB/MME/SUPL (hereinafter, shortly 'eNB'). In this case, the report request message (i.e., location information request message) is encrypted with the UE1's credential (S603).

At the step S603, when the UE1 transmits the report request to the other UE whose location UE1 want to know of, the UE1 can use an validity timer or can attach a message ID (e.g., as the credential) which can be used to uniquely identify the related message. The ID and/or credential can be used as a means for the other UE to verify the validity of UE1's ID. When there is some delay in receiving the response message of the report request message, the unique identification by the use of the message ID and/or the validity timer is helpful for checking whether the response message is a desired message or not.

For example, the UE1 is able to start the validity timer after transmitting the report request message. Since the validity timer is used for validation, the UE1 which received a response (e.g., positive or negative response) will disregard the response message and can send another report request message.

If the UE2 receives the report request message encrypted with the UE1's credential, the UE2 has to verify the UE1's credential (S605).

After the verification, the UE2 decides whether to accept the location information request or not. Accordingly, the UE2 is able to check out the report request is for the MCPTT service or a normal PTT service based on the credential of the UE1. Because the location information is very private information and it has to be protected, it is accepted only if the location information request is for the MCPTT services (i.e., for public safety) but it will be denied when the location information request is for the normal PTT service (i.e., for commercial purpose) (S607).

If the UE2 denies the report request, the UE2 transmits a request rejection notify message (i.e., the ReqReject message) to notify the rejection of the location information request to the UE1 via the eNB (S608).

If the UE2 accepts the report request, the UE2 transmits a request response message (i.e., the ReqResp message) including the location information of the UE2 to the UE1 via the eNB (S609).

The UE1 checks the validity timer has been expired or not when the UE1 received the request response message (S611).

At the step S611, if the validity timer was already expired, the UE1 ignores the request response message and goes back to the ready status or retransmits the report request message.

However, the request response message is received and the validity timer is still working, the UE1 decides whether to request an updating of the UE2's location information or not. For example, in case of the location information is just used for one time, there is no need to update the location information. However, in case of the location information has to be continuously used and has to be updated, the UE1 configures an update request message (i.e., the location information update request message) requesting the update of the location information (S613).

After configuration of the update request message, the UE1 transmits it to the UE2 via the eNB (S615).

The update request message may include configuration information indicating a report type of the location information update. For example, the report type indicates how often the UE1 wants the UE2 to update the UE2's location information to the UE1, such as periodically (e.g., a periodic update) or not, for how long duration of time (e.g., a duration based update), or whenever there is a certain range of change in the location (e.g., an event triggered update), and so on. In addition, the credential of the UE1 can be also included in the update request message for verifying the message and the purpose of the message (e.g., for MCPTT or normal PTT).

After receiving the update request message, the UE2 decides whether to accept the update request or not based on the credential (S617).

If the UE2 denies the update request, the UE2 transmits request rejection notify message to the UE1 (S618).

If the UE2 accepts the update request, the UE2 transmits a request response message (i.e., a location information update response message) to notify the update request of the UE1 (S619).

After then, the UE2 is able to update the UE2's location information periodically, event triggered (on changed based) manner, or time based according to the configuration information.

The UE1 checks the request response message is received or not (S621).

In an aspect of the embodiments, at the step S615, the UE1 is able to start a validity timer after transmitting the update request message. So, if the request response message is not received until the validity timer has been expired, the UE1 resend the update request message to the UE2.

During the MCPTT service, the UE1 checks whether the UE1 cancels the location information update based on the situation. That is, if there is no need to receive the location information of the UE2, the UE1 can cancel the location update request (S623).

So, when the UE1 wishes to cancel the location information update of the UE2, the UE1 transmits a cancel request message (i.e., the location information update cancel request) to the UE2 (S625).

If the UE2 receives the cancel request message, the UE2 does not transmit the UE2's location information anymore. Accordingly, the UE2 transmits the location information to the UE1 until the UE2 receives the cancel request message.

In another aspect of the embodiments, the network node(s) between the Requesting UE (e.g., the UE1) and the Requested UE (e.g., UE2) can or cannot be aware of the messages from one UE depending on the designed forms of transparency (if the messages are designed to be transparent to such node(s), the node(s) cannot see the payload). Please refer to the dotted circle with a note "can be designed to be transparent or non-transparent", for examples. This kind of setting can be applied all of the messages transmitted/received via the eNB. So, if the explained messages are transmitted as transparent manner, the eNB cannot know the contents of the messages but if the messages are set as non-transparent manner, the eNB can read the contents of the message.

In still another aspect of the embodiments, since the Requested UE (e.g., the UE2) may have geographical movement with a certain level of speed, the Requesting UE (e.g., the UE1) may decide to request for Location Information Update depending on its knowledge base (KB) or data base (DB) and other related information that are helpful to make the decision. Also, if the Requesting UE just sends a Request without specifying the forms/period of Update, the Requested UE may decide what forms/period of Update it will use for sending the Update to the Requesting UE. That is, the request UE (i.e., the UE2) is able to decide whether to transmit the location information (or, updated location information) based on the UE2's condition.

Hereinafter, methods for requesting location information report in case of group call cases will be explained.

FIG. 7 is a flowchart illustrating a method for requesting a location information report, updating location information, and canceling the location information update performed in group call case of the MCPTT.

It is assumed that the UE1 and the UE2 are the MCPTT group member with other UEs, and the UE1 and the UE2 are ready to take MCPTT service and are able to MCPTT talk. In this case, the UE1, the UE2 and the other UEs share a group ID of the MCPTT group.

The UE1 may check that whether the UE1 is needed to request the other UE's location information for performing the MCPTT service (S701).

If the location information of the other UE is needed, the UE1 transmits a report request message requesting location information to the UE2 via the eNB/MME/SUPL (hereinafter, shortly 'eNB'). In this case, the report request message (i.e., location information request message) is encrypted with the UE1's credential (S703).

At the step S703, when the UE1 transmits the report request to the other UE whose location UE1 want to know of, the UE1 can use an validity timer or can attach a message ID and the group ID (e.g., as the credential) which can be used to uniquely identify the related message. When there is some delay in receiving the response message of the report request message, the unique identification by the use of the message ID, the group ID and/or the validity timer is helpful for checking whether the response message is a desired message or not.

For example, the UE1 is able to start the validity timer after transmitting the report request message. Since the validity timer is used for validation, the UE1 which received a response (e.g., positive or negative response) will disregard the response message and can send another report request message.

If the UE2 receives the report request message encrypted with the UE1's credential, the UE2 has to verify the UE1's credential. That is, the UE2 verifies the UE1 is the MCPTT member or not (S705).

After the verification, the UE2 decides whether to accept the location information request or not. Accordingly, the UE2 is able to check out the report request is for the MCPTT service or a normal PTT service based on the credential of the UE1. Because the location information is very private information and it has to be protected, it is accepted only if the location information request is for the MCPTT Group (i.e., for public safety) but it will be denied when the location information request is for the normal PTT service (i.e., for commercial purpose) (S707).

If the UE2 denies the report request, the UE2 transmits a request rejection notify message (i.e., the ReqReject message) to notify the rejection of the location information request to the UE1 via the eNB (S708).

If the UE2 accepts the report request, the UE2 transmits a request response message (i.e., the ReqResp message) including the location information of the UE2 to the UE1 via the eNB (S709).

The UE1 checks the validity timer has been expired or not when the UE1 received the request response message (S711).

At the step S711, if the validity timer was already expired, the UE1 ignores the request response message and goes back to the ready status or retransmits the report request message.

However, the request response message is received and the validity timer is still working, the UE1 transmits an announce request message (i.e., the location information announce request message) including the group ID to the eNB (S713).

At the step S713, the location information of the UE2 can be used in the MCPTT group members, so the UE1 request the eNB to announce/broadcast the location information to MCPTT group members.

After receiving the announce request message, the eNB transmit an announce message (i.e., the location information announce message) including the UE2's location information to other UEs in the same MCPTT group (S715).

In addition, the UE1 is able to decide whether to request an updating of the UE2's location information or not. For example, in case of the location information is just used for one time, there is no need to update the location information. However, in case of the location information has to be continuously used and has to be updated, the UE1 configures an update request message (i.e., the location information update request message) requesting the update of the location information (S717).

After configuration of the update request message, the UE1 transmits it to the UE2 via the eNB (S719).

The update request message may include configuration information indicating a report type of the location information update. For example, the report type indicates how often the UE1 wants the UE2 to update the UE2's location information to the UE1, such as periodically (e.g., a periodic update) or not, for how long duration of time (e.g., a duration based update), or whenever there is a certain range of change in the location (e.g., an event triggered update), and so on. In addition, the credential of the UE1 can be also included in the update request message for verifying the message and the purpose of the message (e.g., for MCPTT or normal PTT).

After receiving the update request message, the UE2 decides whether to accept the update request or not based on the credential (S721).

If the UE2 denies the update request, the UE2 transmits request rejection notify message to the UE1 (S722).

If the UE2 accepts the update request, the UE2 transmits a request response message (i.e., a location information update response message) to notify the update request of the UE1 (S723).

After then, the UE2 is able to update the UE2's location information periodically, event triggered (on changed based) manner, or time based according to the configuration information.

The UE1 checks the request response message is received or not (S725).

In an aspect of the embodiment, at the step S719, the UE1 is able to start a validity timer after transmitting the update request message. So, if the request response message is not received until the validity timer has been expired, the UE1 resend the update request message to the UE2.

However, the request response message is received and the validity timer is still working, the UE1 transmits an announce request message (i.e., the location information announce request message) including the group ID to the eNB (S727).

At the step S725, the location information of the UE2 can be used in the MCPTT group members, so the UE1 request the eNB to announce/broadcast the location information to MCPTT group members.

After receiving the announce request message, the eNB transmit an announce message (i.e., the location information announce message) including the UE2's location information to other UEs in the same MCPTT group (S729).

During the MCPTT service, the UE1 checks whether the UE1 cancels the location information update based on the situation. That is, if there is no need to receive the location information of the UE2, the UE1 can cancel the location update request (S731).

So, when the UE1 wishes to cancel the location information update of the UE2, the UE1 transmits a cancel request message (i.e., the location information update cancel request) to the UE2 (S733).

If the UE2 receives the cancel request message, the UE2 does not transmit the UE2's location information anymore. Accordingly, the UE2 transmits the location information to the UE1 until the UE2 receives the cancel request message.

In another aspect of the embodiment, the network node(s) between the Requesting UE (e.g., the UE1) and the Requested UE (e.g., UE2) can or cannot be aware of the messages from one UE depending on the designed forms of transparency (if the messages are designed to be transparent to such node(s), the node(s) cannot see the payload). Please refer to the dotted circle with a note "can be designed to be transparent or non-transparent", for examples. This kind of setting can be applied all of the messages transmitted/received via the eNB. So, if the explained messages are transmitted as transparent manner, the eNB cannot know the contents of the messages but if the messages are set as non-transparent manner, the eNB can read the contents of the message.

For example, if the messages are set by the non-transparent manner, the eNB is able to decode and read the contents of the messages. In this case, the steps of S713, S715, S727 and S729 cannot be performed and the eNB is able to announce or broadcast the location information of the UE2 to the MCPTT group members.

In still another aspect of the embodiment, since the Requested UE (e.g., the UE2) may have geographical movement with a certain level of speed, the Requesting UE (e.g., the UE1) may decide to request for Location Information Update depending on its knowledge base (KB) or data base (DB) and other related information that are helpful to make the decision. Also, if the Requesting UE just sends a Request without specifying the forms/period of Update, the Requested UE may decide what forms/period of Update it will use for sending the Update to the Requesting UE. That is, the request UE (i.e., the UE2) is able to decide whether to transmit the location information (or, updated location information) based on the UE2's condition.

FIG. 8 is a flowchart illustrating another method for requesting a location information report, updating location information, and canceling the location information update performed in group call case of the MCPTT.

It is assumed that the UE1 and the UE2 are the MCPTT group member with other UEs, and the UE1 and the UE2 are ready to take MCPTT service and are able to MCPTT talk. In this case, the UE1, the UE2 and the other UEs share a group ID of the MCPTT group.

The UE1 may check that whether the UE1 is needed to request the other UE's location information for performing the MCPTT service (S801).

If the location information of the other UE is needed, the UE1 transmits a report request message requesting location information to the UE2 via the eNB/MME/SUPL (hereinafter, shortly 'eNB'). In this case, the report request message (i.e., location information request message) is encrypted with the UE1's credential (S803).

At the step S803, when the UE1 transmits the report request to the other UE whose location UE1 want to know of, the UE1 can use an validity timer or can attach a message ID and the group ID (e.g., as the credential) which can be used to uniquely identify the related message. When there is some delay in receiving the response message of the report request message, the unique identification by the use of the message ID, the group ID and/or the validity timer is helpful for checking whether the response message is a desired message or not.

For example, the UE1 is able to start the validity timer after transmitting the report request message. Since the validity timer is used for validation, the UE1 which received a response (e.g., positive or negative response) will disregard the response message and can send another report request message.

If the UE2 receives the report request message encrypted with the UE1's credential, the UE2 has to verify the UE1's credential. That is, the UE2 verifies the UE1 is the MCPTT member or not (S805).

After the verification, the UE2 decides whether to accept the location information request or not. Accordingly, the UE2 is able to check out the report request is for the MCPTT service or a normal PTT service based on the credential of the UE1. Because the location information is very private information and it has to be protected, it is accepted only if the location information request is for the MCPTT Group (i.e., for public safety) but it will be denied when the location information request is for the normal PTT service (i.e., for commercial purpose) (S807).

If the UE2 denies the report request, the UE2 transmits a request rejection notify message (i.e., the ReqReject message) to notify the rejection of the location information request to the UE1 via the eNB (S808).

If the UE2 accepts the report request, the UE2 transmits a request response message (i.e., the ReqResp message) including the location information of the UE2 to the UE1 via the eNB (S809).

In this case, the UE2 can recognize that the location information of the UE2 will be used for the MCPTT group members, so the UE2 transmits an announce request message (i.e., the location information announce request message) including the location information of the UE2 and the group ID to the eNB. After receiving the announce request message, the eNB transmit an announcement message (i.e., the location information announce message) including the UE2's location information to other UEs in the same MCPTT group (S811).

The UE1 checks the validity timer has been expired or not when the UE1 received the request response message (S813).

At the step S813, if the validity timer was already expired, the UE1 ignores the request response message and goes back to the ready status or retransmits the report request message.

However, the request response message is received and the validity timer is still working, the UE1 uses the location information of the UE2 for the purpose of the MCPTT service.

In addition, the UE1 is able to decide whether to request an updating of the UE2's location information or not. For example, in case of the location information is just used for one time, there is no need to update the location information. However, in case of the location information has to be continuously used and has to be updated, the UE1 configures an update request message (i.e., the location information update request message) requesting the update of the location information (S815).

After configuration of the update request message, the UE1 transmits it to the UE2 via the eNB (S817).

The update request message may include configuration information indicating a report type of the location information update. For example, the report type indicates how often the UE1 wants the UE2 to update the UE2's location information to the UE1, such as periodically (e.g., a periodic update) or not, for how long duration of time (e.g., a duration based update), or whenever there is a certain range of change in the location (e.g., an on change based update), and so on. In addition, the credential of the UE1 can be also included in the update request message for verifying the message and the purpose of the message (e.g., for MCPTT or normal PTT).

After receiving the update request message, the UE2 decides whether to accept the update request or not based on the credential (S819).

If the UE2 denies the update request, the UE2 transmits request rejection notify message to the UE1 (S820).

If the UE2 accepts the update request, the UE2 transmits a request response message (i.e., a location information update response message) to notify the update request of the UE1 (S821).

After then, the UE2 is able to update the UE2's location information periodically, event triggered (on changed based) manner, or time based according to the configuration information. In this case, the UE2 can recognize that the location information of the UE2 will be used for the MCPTT group members, so the UE2 transmits an announce request message (i.e., the location information announce request message) including the location information of the UE2 and the group ID to the eNB. Whenever receiving the announce request message, the eNB transmit an announcement message (i.e., the location information announce message) including the UE2's location information to other UEs in the same MCPTT group (S823).

The UE1 checks the request response message is received or not (S825).

In an aspect of the embodiment, at the step S817, the UE1 is able to start a validity timer after transmitting the update request message. So, if the request response message is not received until the validity timer has been expired, the UE1 resend the update request message to the UE2.

During the MCPTT service, the UE1 checks whether the UE1 cancels the location information update based on the situation. That is, if there is no need to receive the location information of the UE2, the UE1 can cancel the location update request (S827).

So, when the UE1 wishes to cancel the location information update of the UE2, the UE1 transmits a cancel request message (i.e., the location information update cancel request) to the UE2 (S829).

If the UE2 receives the cancel request message, the UE2 does not transmit the UE2's location information anymore. Accordingly, the UE2 transmits the location information to the UE1 until the UE2 receives the cancel request message.

In another aspect of the embodiment, the network node(s) between the Requesting UE (e.g., the UE1) and the Requested UE (e.g., UE2) can or cannot be aware of the messages from one UE depending on the designed forms of transparency (if the messages are designed to be transparent to such node(s), the node(s) cannot see the payload). Please refer to the dotted circle with a note "can be designed to be transparent or non-transparent", for examples. This kind of setting can be applied all of the messages transmitted/received via the eNB. So, if the explained messages are transmitted as transparent manner, the eNB cannot know the contents of the messages but if the messages are set as non-transparent manner, the eNB can read the contents of the message.

For example, if the messages are set by the non-transparent manner, the eNB is able to decode and read the contents of the messages. In this case, the steps of S811 and S813 cannot be performed and the eNB is able to announce or broadcast the location information of the UE2 to the MCPTT group members.

In still another aspect of the embodiment, since the Requested UE (e.g., the UE2) may have geographical movement with a certain level of speed, the Requesting UE (e.g., the UE1) may decide to request for Location Information Update depending on its knowledge base (KB) or data base (DB) and other related information that are helpful to make the decision. Also, if the Requesting UE just sends a Request without specifying the forms/period of Update, the Requested UE may decide what forms/period of Update it will use for sending the Update to the Requesting UE. That is, the request UE (i.e., the UE2) is able to decide whether to transmit the location information (or, updated location information) based on the UE2's condition.

4. Apparatuses for Implementing the Aforementioned Methods

FIG. 9 shows apparatuses for implementing the above-mentioned methods described with reference to FIGS. 1 to 8.

A UE can serve as a transmitting end on uplink and as a receiving end on downlink. An eNB can serve as a receiving end on uplink and as a transmitting end on downlink.

The UE and the eNB may include transmitter 840 and 850 and receiver 860 and 870 for controlling transmission and reception of signal, data and/or messages and antennas 800 and 810 for transmitting and receiving signal, data and/or messages, respectively. In this case, the UE may further include a screen to display user information such as a current time, a battery state, an event occurrence history, weather, and/or multimedia contents etc.

In addition, the UE and the eNB may respectively include processors 820 and 830 for performing the above-described embodiments of the present invention and memories 870 and 890 for storing processing procedures of the processors temporarily or continuously. For example, the processor of the requesting UE is able to configure the messages request report, update or cancellation of the location information and control the transmitter to transmit the request messages. In addition, the processor of the requested UE is able to configure the messages responding to the requests and control the transmitter to transmit the response messages. The detail of the embodiments of the present application can be referred to sections 1 to 3 as disclosed above.

The embodiments of the present invention can be performed using the aforementioned components and functions of the UE and the eNB. The transmitter 840 and 850 and the receiver 860 and 870 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) unit.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

The invention claimed is:

1. A method for providing location information in a wireless access system supporting a Mission Critical Push to Talk (MCPTT) service over long term evolution (LTE), the method performed by a requested user equipment (UE) and comprising:

receiving, from a requesting UE, a report request message requesting a report of location information of the requested UE, wherein the report request message is encrypted with a credential of the requesting UE and the location information represents a current physical location of the requested UE;

verifying the credential of the requesting UE, wherein the credential is configured with an identifier (ID) of the requesting UE and a qualification of the MCPTT service;

determining whether to accept the request for the report of location information by determining whether the report request message is for the MCPTT service or a normal Push to Talk (PTT) service based on the credential; and transmitting, to the requesting UE, a report response message including the location information of the requested UE, when the credential of the requesting UE has been determined to be for the MCPTT service, or transmitting, to the requesting UE, a request reject message indicating that the report request is denied, when the credential of the requesting UE has been determined to be for the normal PTT service, wherein the MCPTT service is used for a public safety and utility services and provides communication among the requesting and the requested UEs, and wherein the PTT service is used for a commercial purpose among the requesting and the requested UEs.

2. The method according to claim 1, wherein the verifying further verifies whether or not the requesting UE is a member of an MCPTT Group.

3. The method according to claim 1, further comprising: transmitting, to an evolved Node B (eNB), an announce request message including the location information and a group ID of an MCPTT Group.

4. The method according to claim 1, further comprising: receiving an update request message including configuration information indicating a report type of a location information update.

5. The method according to claim 4, wherein the report type indicates one of a periodic update, a duration based update, or an on-change-based update.

6. The method according to claim 5, further comprising: receiving an update cancellation request message from the requesting UE.

7. A requested user equipment (UE) for providing location information in a wireless access system supporting a Mission Critical Push to Talk (MCPTT) service, the requested UE comprising:

a transmitter;
a receiver; and
a processor,
wherein the processor is configured to:
control the receiver to receive, from a requesting UE, a report request message requesting a report of location information of the requested UE, wherein the report request message is encrypted with a credential of the requesting UE and the location information represents a current physical location of the requested UE, verify the credential of the requesting UE, wherein the credential is configured with an identifier (ID) of the requesting UE and a qualification of the MCPTT service, determine whether to accept the request of location information by determining whether the report request message is for the MCPTT service or a normal Push to Talk (PTT) service based on the credential, and control the transmitter to transmit, to the requesting UE, a report response message including the location information of the requested UE, when the credential of the requesting UE has been determined to be for the MCPTT service, or control the transmitter to transmit, to the requesting UE, a request reject message indicating that the report request is denied, when the report request message has been determined to be for the normal PTT service, wherein the MCPTT service is used for a public safety and utility services and provides communication among the requesting and the requested UEs, and wherein the PTT service is used for a commercial purpose services among the requesting and the requested UEs.

8. The requested UE according to claim 7, wherein the processor is further configured to verify whether or not, the requesting UE is a member of an MCPTT Group.

9. The requested UE according to claim 7, wherein the processor is further configured to control the transmitter to transmit, to an evolved Node B (eNB), an announcement requested message including the location information and a group ID of an MCPTT Group.

10. The requested UE according to claim 7, wherein the processor is further configured to control the receiver to receive an update request message including configuration information indicating a report type of a location information update.

11. The requested UE according to claim 10, wherein the report type indicates one of a periodic update, a duration based update, or an on-change-based update.

12. The requested UE according to claim 11, wherein the processor is further configured to control the receiver to receive an update cancellation request message from the requesting UE.

* * * * *